(12) United States Patent
Lee et al.

(10) Patent No.: US 6,259,613 B1
(45) Date of Patent: *Jul. 10, 2001

(54) POWER FACTOR CORRECTION (PFC) CIRCUIT

(75) Inventors: Sang-Woo Lee; Kyung-Hee Jang, both of Kyungki-do (KR)

(73) Assignee: Samsung Electronics Co., Ltd., Suwon (KR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/317,805

(22) Filed: May 24, 1999

(30) Foreign Application Priority Data

May 22, 1998 (KR) .................................. 98-18470

(51) Int. Cl.[7] .......................... H02M 5/42; H02M 7/217; G05F 1/10
(52) U.S. Cl. .......................... 363/89; 363/127; 323/222; 323/284
(58) Field of Search ................................. 363/89, 127, 80, 363/81; 323/222, 282, 283, 284, 285, 288

(56) References Cited

U.S. PATENT DOCUMENTS

| | | | |
|---|---|---|---|
| 5,644,214 | * | 7/1997 | Lee ........................................ 323/211 |
| 5,764,039 | * | 6/1998 | Choi et al. ............................ 323/222 |
| 5,804,950 | * | 9/1998 | Hwang et al. ........................ 323/222 |

* cited by examiner

Primary Examiner—Rajnikant B. Patel
(74) Attorney, Agent, or Firm—Marger Johnson & McCollom, P.C.

(57) ABSTRACT

A power factor correction circuit is disclosed which is comprised of a boost converter that generates an output voltage to a secondary load according to operation of the switch. The circuit also includes a switching controller which multiplies together a secondary side error voltage of the boost converter and a voltage representative of the input current of the boost converter. The switching controller compares the multiplied voltage with a reverse sawtooth wave voltage, and controls the switch of the boost converter according to the comparison results.

6 Claims, 3 Drawing Sheets

POWER FACTOR CORRECTION (PFC) CIRCUIT

CROSS REFERENCE TO RELATED APPLICATIONS

This application claims priority from Korean Priority Document No. 98-18470, filed on May 22, 1998 with the Korean Industrial Property Office, which document is hereby incorporated by reference.

BACKGROUND OF THE INVENTION

1. Field of the Invention

The present invention relates to a power factor correction (PFC) circuit. More specifically, the present invention relates to a PFC circuit for controlling a phase of an input current to be identical with a phase of an input voltage by adjusting a duty ratio of a switch using the input current detected on the ground potential.

2. Description of the Related Art

FIG. 1 shows a conventional PFC circuit. A filter 1 and a bridge diode 2 rectify AC power from an AC 14 source to supply an input voltage Vs smoothened by a capacitor C1. An input current $i_L$ is supplied to a primary side of an inductor L, which is switched according to the ON and OFF states of the switch 3, which is a Metal Oxide Semiconductor Field Effect Transistor (MOSFET). Accordingly, an output voltage Vo is supplied to a load. A diode D1 and a capacitor C2 rectify the output voltage Vo so as to supply the rectified voltage Vout to an adjustable load Ro.

The circuit also includes a controller 40. A reference voltage Vref is supplied to an error amplifier 4 through a noninverting input terminal. A voltage, produced by dividing Vout with two resistors R1 and R2, is supplied to the error amplifier 4 through an inverting input terminal. The error amplifier 4 amplifies a difference voltage by a predetermined ratio, and outputs the amplified voltage Veo to an subtractor 5. The subtractor 5 subtracts the reference voltage Vref from the voltage Veo, and outputs a voltage V2.

A resistive divider made by resistors R3 and R4 produces a voltage V1. A multiplier 6 multiplies the voltage V2 and a voltage V1, and outputs a multiplied voltage Vmo.

A comparator 7 compares the voltage Vmo with a voltage of a resistor Rs which is coupled between the source of the switching MOSFET 3 and the ground. A latch circuit 8 logically latches signals provided from the comparator 7 and a current detector 9, and outputs the latched signal to a logical NOR gate 10.

The current detector 9 detects a current flowing through the inductor L in order to control the switch 3. The logical NOR gate 10 executes a logical NOR operation on the signals provided from the latch circuit 8 and the current detector 9, so as to control the switch 3. Therefore, when the input voltage Vs is increased (or reduced) and the voltage V1 which detects the amount of fluctuation that the input voltage Vs is increased (or reduced), the multiplied voltage Vmo is increased (or reduced), and the turn on duty ratio of the switching MOSFET 3 is altered, thereby, the output voltage Vo is increased (or reduced).

However, since the resistor Rs to detect the input current flowing through the inductor is coupled between the source of the switching MOSFET and the ground, when the switching MOSFET is turned on, it exhibits poor characteristics, such as switching noise. Additionally, all three of the input current, input voltage, and the output voltage need to be detected in order to compensate for the power factor. This complicates the circuit and increases its cost.

SUMMARY OF THE INVENTION

It is an object of the present invention to provide a power factor correction circuit for detecting information on input current on the ground potential and adjusting the turn on duty ratio by using the detected input current, thereby controlling the phase and amplitude of the input current to be identical with those of the input voltage.

In one aspect of the present invention, one end of the detection resistor Rs is coupled to a point at which the source of the switching MOSFET is grounded, and the other end of the resistor Rs is coupled to a voltage amplifier. The input current is detected by the voltage drop across both the ends of the detection resistor Rs, and the voltage is amplified by the voltage amplifier and is output to a multiplier. Since Rs is partially grounded there is less noise.

The circuit further provides a multiplier that multiplies together the voltage supplied from the voltage amplifier and a secondary side error voltage that is representative of the output voltage. The multiplier outputs a multiplied voltage. The multiplied voltage is compared to a reverse sawtooth waveform for controlling the duty ratio of the switching MOSFET.

The resulting circuit is simpler because it only detects the input current and input voltage, i.e., only two quantities. These and other advantages will be better appreciated in view of the attached drawings and Detailed Description of the invention.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention is shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
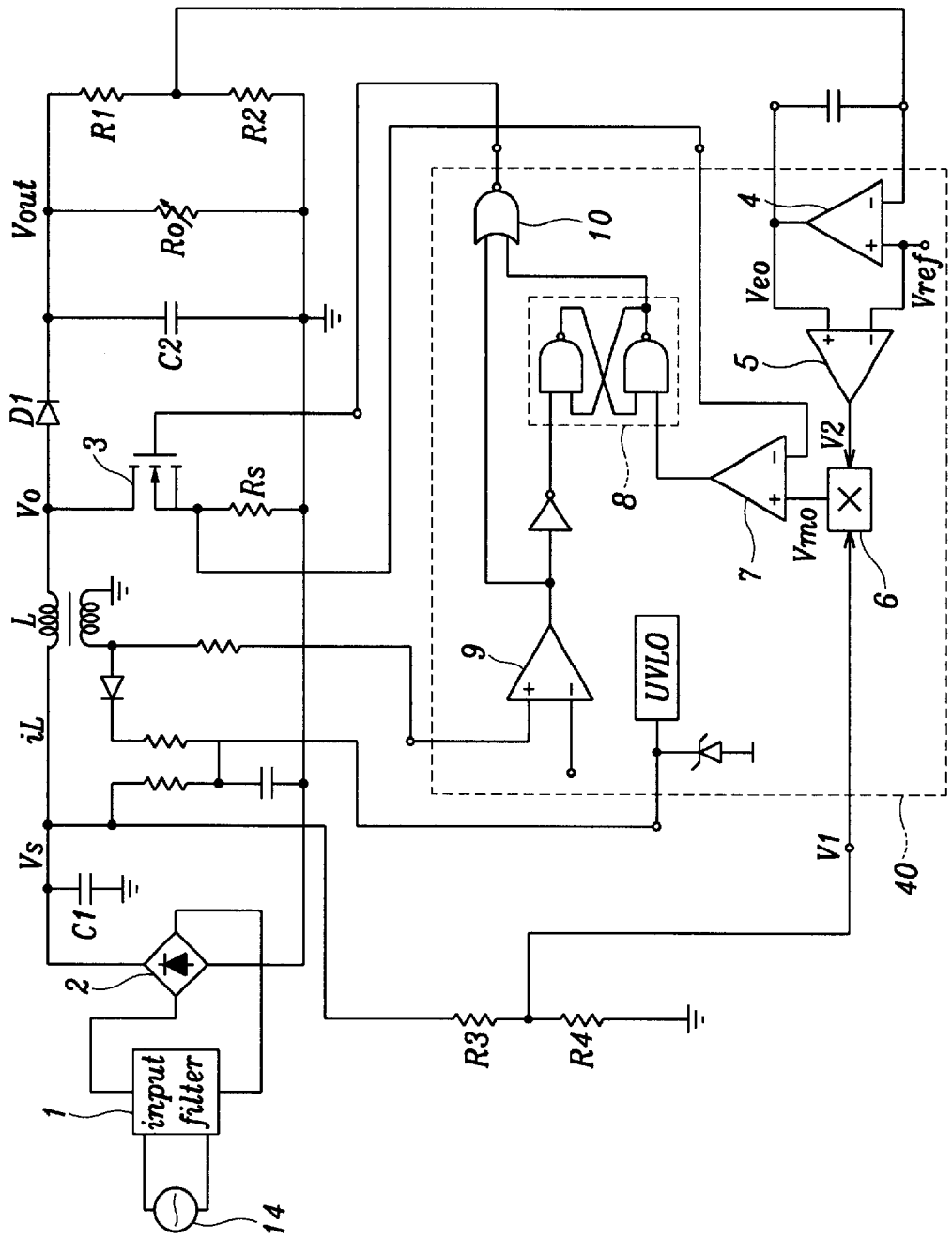
FIG. 1 illustrates a conventional PFC circuit.
Figure 2:
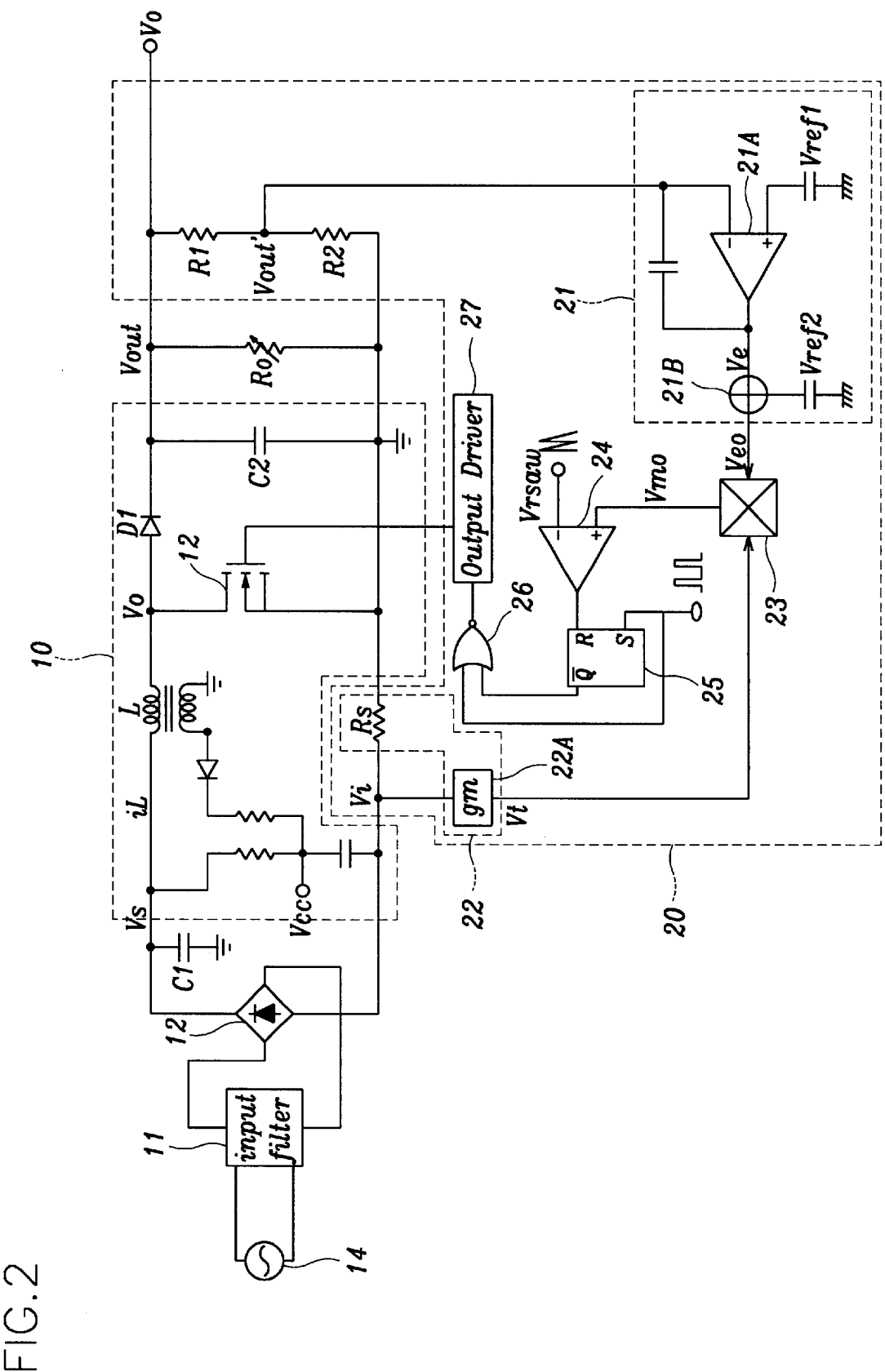
FIG. 2 illustrates a PFC circuit according to a preferred embodiment of the present invention.

It will be immediately apparent that the invention can work with a variety of types of input voltages. In the example of FIG. 2, the output of an AC source 14 is rectified by an input filter 11 and a diode bank 12, and smoothened by a capacitor C1 to produce a voltage Vs.

FIG. 2 shows a PFC circuit according to a preferred embodiment of the present invention. The PFC circuit comprises a boost converter 10 receiving voltage Vs and generates an output voltage Vout to a secondary load. The PFC further includes a switching controller 20 which controls the boost converter.

The boost converter 10 includes an inductor L and a switch 12, such as MOSFET 12, which controls a current $i_L$ flowing through the inductor L. The boost converter further includes a rectifier which rectifies the output voltage Vo of the inductor L, and provides the rectified voltage Vout to a load Ro. The rectifier is made by a diode D1 and a capacitor C2.

The switching controller 20 includes an error amplification unit 21 which detects the output voltage Vout of the boost converter 10. The error amplification unit 21 includes an error amplifier 21A which receives a first reference voltage Vref1 through a noninverting (+) terminal and also receives a voltage Vout' dividing the output voltage Vout of the boost converter 10 divided by two resistors R1 and R2 through an inverting (−) terminal, and amplifies the received voltage Vout' by a predetermined amplification ratio. Unit 21 also includes a subtractor 21B which subtracts the output voltage Ve of the error amplifier 21A from a second reference voltage Vref2. This produces side error voltage Veo.

In this case, when the output voltage Vout' is increased according to the fluctuation of the load voltage and the voltage supplied through the inverting input terminal becomes greater, then the amplified difference voltage Ve is reduced. When the output voltage Vout' is reduced according to the fluctuation of the load voltage and the voltage supplied through the inverting input terminal becomes less, then the amplified difference voltage Ve is increased.

The subtractor 21B subtracts the amplified difference voltage Ve of the error amplifier 21A from the second reference voltage Vref2. When a reduced amplified difference voltage Ve is provided to the subtractor 21B from the error amplifier 21A, an increased secondary side error voltage Veo is output. When an increased amplified difference voltage Ve is provided to the subtractor 21B from the error amplifier 21A, a reduced secondary side error voltage Veo is output. In this case, the second reference voltage is set to a predetermined level such that the secondary side error voltage Veo always maintains positive (+) level. The switching control 21 further includes a current detection unit 22.

The switching controller further includes a current detection unit 22. Unit 22 includes a detection resistor Rs. A voltage difference between the ends of the resistor Rs is changed in proportion to the changes of the input current $i_L$ flowing through the inductor L when the switching MOSFET 12 is turned on. Unit 22 additionally includes a voltage amplifier 22A, which amplifies the voltage across the ends of the detection resistor by a predetermined amplification ratio, and outputs the amplified voltage. This produces an output voltage $V_t$.

One end of the detection resistor Rs is coupled to a point at which the source of the switching MOSFET 12 is grounded, and the other end of the detection resistor Rs is coupled to an input terminal of the voltage amplifier 22A. That is, when the input current $i_L$ is increased, the voltage across both the ends of the detection resistor Rs is increased, and the voltage Vt provided from the voltage amplifier 22A is increased. When the input current $i_L$ is reduced, the voltage across both the ends of the detection resistor Rs is reduced, and the voltage Vt provided from the voltage amplifier 22A is reduced. Amplifier 22A can be advantageously implemented as a transconductance amplifier having a gain gm.

As such, current detection unit 22 amplifies the detection voltage Vi to detect the input current $i_L$ flowing through the inductor L by a predetermined amplification ratio when the switching MOSFET is turned on, and outputs the amplified voltage.

The switching controller 20 further includes a multiplier 23. The multiplier multiplies together the output voltage Vt of the current detection unit 22 and the secondary side error voltage Veo of the error amplification unit 21. This produces a multiplied voltage Vmo.

The switching controller 20 further includes a comparator 24 which compares the output voltage Vmo of the multiplier 23 with a reverse sawtooth wave voltage Vrsaw. The comparator receives the reverse sawtooth wave voltage Vrsaw through its inverting input terminal and receives the voltage Vmo through its noninverting input terminal, and outputs a comparative wave voltage.

The switching controller 20 further includes a flip-flop 25 which receives the comparative wave voltage of the comparator 24 through a reset terminal R, and a clock signal through a set terminal S and combines them.

The switching controller 20 further includes a logical NOR gate 26 which executes a logical NOR operation on the inverted output (Qbar) of the flip-flop 25 and on the clock signal. The clock signal provided to the flip-flop 25 is identical with the clock signal provided to the logical NOR gate 26, and the clock signal has same frequency with that of the reverse sawtooth waves. The switching controller 20 also includes an output driver 27, which drives the switching MOSFET 12 according to the output of the logical NOR gate.

As will be appreciated, the switching controller multiplies together a secondary side error voltage Veo and a voltage Vt obtained by amplifying the detection voltage Vi to detect the input current $i_L$ of the boost converter 10, and compares the multiplied voltage with a reverse sawtooth wave voltage Vrsaw, and controls the switch of the boost converter 10 according to the comparison results.

ON and OFF operations of the switching MOSFET 12 will now be described.

When the reverse sawtooth wave voltage Vrsaw is greater than the output Vmo of the multiplier 23, and low signal is provided to the reset terminal R of the flip-flop 25, and high clock signal is provided to the set terminal S of the flip-flop 25, and therefore the flip-flop outputs a low signal through the inverting output terminal ($\overline{Q}$), then the logical NOR gate 26 drives the output driver 27 to turn on the switching MOSFET 12. However, when the output voltage of the voltage amplifier or output voltage of the error amplifier is increased, and the output voltage Vmo of the multiplier 23 is greater than the reverse sawtooth wave voltage Vrsaw, a high signal is provided to the reset terminal R of the flip-flop 25, and the flip-flop outputs a high clock signal to the logical NOR gate through the inverting output terminal. Then the logical NOR gate 26 drives the output driver 27 to turn off the switching MOSFET 12.

Figure 3:
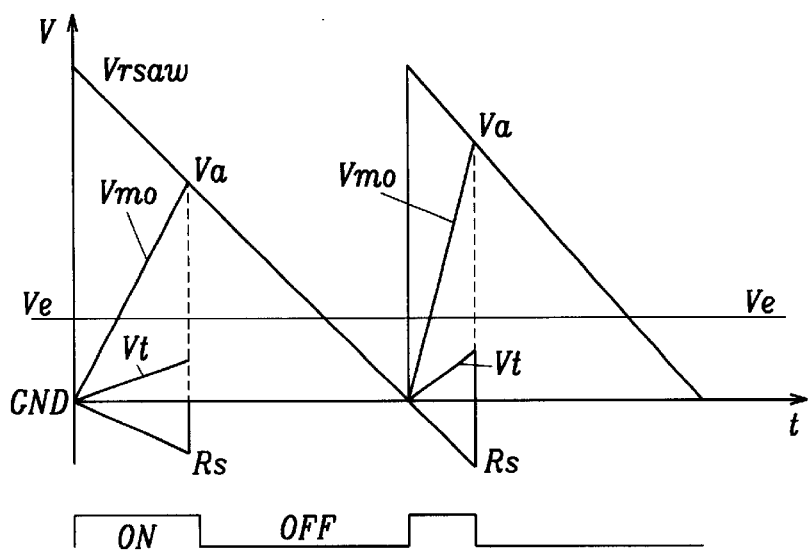
FIG. 3 illustrates waveforms for selected points in the PFC circuit of FIG. 2.

FIG. 3 shows waveforms for selected points in the PFC circuit. The duty ratio of turning on the switching MOSFET is changed according to the changes of the input voltage detected by the current detection unit. Referring to FIG. 3, for more detail, when the voltage across both the ends of the detection resistor is increased due to an increase of the input current, the output voltage Vt of the voltage amplifier 22A is increased, and therefore, the output voltage Vmo of the multiplier 23 is increased and the turn on duty ratio of the switching MOSFET is reduced.

In the present invention, as described above, the current detection unit 22 functions as a feedforward unit so that the input current $i_L$ may be controlled to have an identical phase with regard to the input voltage Vs. The above description will now be shown in equations.

A voltage $V_{LOFF}$ stored in the inductor L, when the switching MOSFET 12 is turned off, is shown by Equation 1:

$$V_{LOFF} = V_O - V_S = L \cdot \frac{di_L}{dt_{off}} \quad \text{Equation 1}$$

and, voltage $V_{LON}$ stored in the inductor L, when the switching MOSFET 12 is turned on, is shown by Equation 2.

$$V_{LON} = V_S = L \cdot \frac{di_L}{dt_{on}} \quad \text{Equation 2}$$

Solving both Equations for $L \cdot di_L$ yields:

$$L \cdot di_L = V_S \cdot dt_{on} = (V_O - V_S) \cdot dt_{off} \quad \text{Equation 3}$$

Solving Equation 3, and substituting T for $dt_{on} + dt_{off}$, one derives:

$$V_S = V_O \cdot \left(1 - \frac{dt_{on}}{T}\right) \quad \text{Equation 4}$$

The switching MOSFET 12 is turned off when:

$$V_{mo} = V_{rsaw} \quad \text{Equation 5}$$

The amplitude of the reverse sawtooth voltage is given by:

$$V_{rsaw} = V_a \left(1 - \frac{dt_{on}}{T}\right) \quad \text{Equation 6}$$

where Va is the reverse sawtooth wave voltage Vrsaw when the switching MOSFET is turned off.

Setting the gain of the multiplier 23 as K, and plugging Equation 6 into Equation 5 yields:

$$K \cdot V_{eo} \cdot g_m = V_a \cdot \left(1 - \frac{dt_{on}}{T}\right) \quad \text{Equation 7}$$

where, $g_m$ is a gain of a transconductance amplifier.

Substitution of Equation 4 in Equation 7, $$K \cdot V_{eo} \cdot g_m = V_a \cdot \frac{V_S}{V_O} \quad \text{Equation 8}$$

and noting that $$g_m = \frac{i_L(t)}{V_{RS}},$$

Equation 8 becomes:

$$K \cdot V_{eo} \cdot \frac{i_L(t)}{V_{RS}} = V_a \cdot \frac{V_S}{V_O} \quad \text{Equation 9}$$

Solving Equation 9 for input current $i_L$ yields:

$$i_L(t) = \frac{V_{RS} \cdot V_a}{K \cdot V_{eo} \cdot V_O} \cdot V_S \quad \text{Equation 10}$$

Setting $$\frac{V_{RS} \cdot V_a}{K \cdot V_{eo} \cdot V_O}.$$

as a constant $K_C$ yields:

$$i_L(t) = K_C \cdot V_S \quad \text{Equation 11}$$

Setting $V_S = V_{SO} \sin \omega t$ one obtains:

$$i_L(t) = K_C \cdot V_{SO} \cdot \sin \omega t \quad \text{Equation 12}$$

Therefore, the input current $i_L$ is a product of the input voltage Vs and the constant $K_C$.

Figure 4:
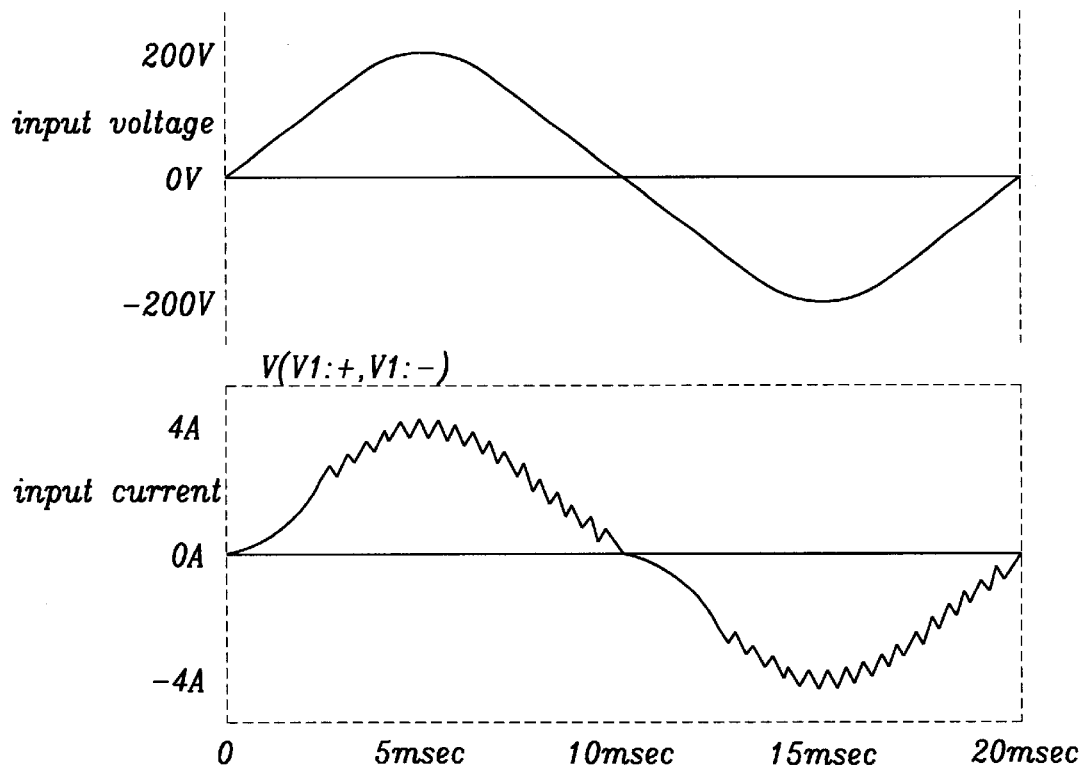
FIG. 4 illustrates waveforms of the input current and input voltage of the PFC circuit of FIG. 2.

FIG. 4 shows waveforms of the operations of the input current and input voltage, showing that the input current changes in the identical phase according to the changes of the input voltage.

Hence, since the PFC circuit according to the preferred embodiment of the present invention is a simple circuit that compensates for the power factor by only detecting the input current and output voltage, and also because the resistor to detect the input current is grounded, improved characteristics against noise are obtained.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A power factor correction circuit for receiving an input voltage and for generating a dc output voltage, comprising:
    a first input node and a second input node for receiving the input voltage;
    a first output node and a second output node for outputting the generated dc output voltage to a load, wherein the second output node is coupled to a ground;
    an inductor and a diode coupled between the first input node and the first output node;
    a switch having a first switch terminal coupled between the inductor and the diode, and a second switch terminal coupled with the ground; and
    a switching controller for controlling the switch, the switching controller including a detection resistor coupled between the second input node and the second output node, wherein the detection resistor senses a current between the second input node and the second output node, and wherein the switching controller includes a transconductance stage with an operation responsive to the sensed current.

2. The circuit of claim 1, wherein the switching controller is for multiplying together a secondary side error voltage of the generated dc output voltage and a voltage related to the voltage drop across the detection resistor for producing a multiplied voltage, and for comparing the multiplied voltage with a reverse sawtooth wave voltage, and for controlling the switch according to the comparison results.

3. The voltage converter of claim 2, wherein the switching controller includes:
    an error amplification unit for detecting the generated dc output voltage and for comparing it with a first reference voltage to produce the secondary side error voltage,
    a current detection unit for detecting the input current flowing through the inductor and thereby producing a detection voltage, and for amplifying the detection voltage by a predetermined amplification ratio when the switch is turned on, and for outputting the amplified voltage, wherein the current detection unit includes the detection resistor placed in the path of the input current flowing through the inductor when the switch is turned on, and an amplifier for amplifying a voltage difference between ends of the detection resistor by a predetermined amplification ratio, and for outputting the amplified voltage difference, a multiplier multiplying the amplified voltage of the current detection unit and the secondary side error voltage, a comparator comparing an output voltage of the multiplier with the reverse sawtooth wave voltage, a flip-flop receiving an output signal of the comparator through a reset terminal, and a clock signal through a set terminal, a logical NOR gate executing a logical NOR operation on an inverted output of the flip-flop and the clock signal, and an output driver driving the switch according to the output of the logical NOR gate.

4. The circuit of claim 3, wherein the error amplification unit includes:

an error amplifier for receiving the first reference voltage through a noninverting terminal and for receiving a voltage representative of the output voltage of the boost converter through an inverting terminal, and a subtractor for subtracting an output voltage of the error amplifier from a second reference voltage thereby producing the side error voltage.

5. The circuit of claim 2, wherein the reverse sawtooth wave voltage has a sawtooth period, and the clock signal has a clock period equal to the sawtooth period.

6. The circuit of claim 5, wherein the sawtooth wave voltage has a wave segment that starts to decrease at a start at the sawtooth period, and wherein the clock signal switches to an ON state at the start of the sawtooth period.

* * * * *